United States Patent
Van Brackle et al.

(10) Patent No.: US 9,675,870 B1
(45) Date of Patent: Jun. 13, 2017

(54) MONEY PUZZLE BOX

(71) Applicants: Anita Van Brackle, Dallas, GA (US); Dalton LeMelle, Dallas, GA (US)

(72) Inventors: Anita Van Brackle, Dallas, GA (US); Dalton LeMelle, Dallas, GA (US)

(*) Notice: Subject to any disclaimer, the term of this patent is extended or adjusted under 35 U.S.C. 154(b) by 0 days.

(21) Appl. No.: 15/213,545

(22) Filed: Jul. 19, 2016

(51) Int. Cl.
*A63F 9/08* (2006.01)
*G09B 19/02* (2006.01)
*A63F 9/10* (2006.01)
*A63F 9/00* (2006.01)

(52) U.S. Cl.
CPC .......... *A63F 9/10* (2013.01); *A63F 9/0098* (2013.01); *G09B 19/02* (2013.01); *A63F 2250/13* (2013.01)

(58) Field of Classification Search
CPC ...... A63F 9/10; A63F 9/0098; A63F 2250/13; G09B 19/02; G09B 19/018; B65D 5/20; B65D 5/28; B65D 5/6667
See application file for complete search history.

(56) References Cited

U.S. PATENT DOCUMENTS

| | | | | |
|---|---|---|---|---|
| 2,765,973 A * | 10/1956 | Goldstein | ............... | B65D 5/28 229/125 |
| 3,488,864 A * | 1/1970 | McManus | ............... | G09B 19/18 206/0.83 |
| 3,652,086 A * | 3/1972 | Stecker | ............... | A63F 9/0402 206/315.1 |
| 3,995,704 A * | 12/1976 | Blickman | ............... | A63F 3/0023 273/258 |
| 4,371,168 A * | 2/1983 | Dupuis | ............... | A63F 3/0023 206/315.1 |
| 4,571,189 A * | 2/1986 | Shank | ............... | G09B 19/18 434/110 |
| 4,752,227 A | 6/1988 | Yamin | | |
| 4,775,321 A | 10/1988 | Coomeaux | | |
| 5,152,710 A * | 10/1992 | Montgomery | ............... | A63H 3/52 206/427 |
| 5,191,972 A * | 3/1993 | Helzer | ............... | A47G 1/12 206/0.8 |
| 5,478,085 A * | 12/1995 | Canner | ............... | A63F 3/00694 273/239 |
| D402,784 S * | 12/1998 | Saunders | ............... | D21/351 |
| 6,554,130 B1 * | 4/2003 | Krull | ............... | G09B 19/18 206/0.8 |
| D486,183 S * | 2/2004 | DeMaison | ............... | D19/59 |
| 7,837,031 B2 * | 11/2010 | Counts | ............... | G07D 9/002 206/0.84 |
| 8,529,266 B1 * | 9/2013 | Akin | ............... | G09B 19/02 434/191 |
| 2002/0163126 A1 * | 11/2002 | Caldwell | ............... | A63F 9/1044 273/157 R |

(Continued)

FOREIGN PATENT DOCUMENTS

WO          0235498 A2     5/2002

*Primary Examiner* — Steven Wong (57) ABSTRACT

The money puzzle box is adapted for use with a currency. The money puzzle box is adapted for use with coins associated with the currency. The money puzzle box comprises a game board and a plurality of coin pieces. The plurality of coin pieces are pieces to a puzzle that are assembled upon the game board. The solution to the puzzle requires knowledge of a currency, which is being tested by the puzzle. The game board further folds into a box, which is used as a container within which the plurality of coin pieces are stored.

7 Claims, 5 Drawing Sheets

(56) References Cited

U.S. PATENT DOCUMENTS

| | | |
|---|---|---|
| 2006/0040242 A1 | 2/2006 | Mejia |
| 2007/0048701 A1* | 3/2007 | Fields .................... G09B 19/02 434/188 |
| 2014/0356818 A1 | 12/2014 | Elgin |

* cited by examiner

MONEY PUZZLE BOX

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of card and board games, more specifically, a two-dimensional jigsaw puzzle.

SUMMARY OF INVENTION

The money puzzle box is adapted for use with a currency. The money puzzle box is adapted for use with coins associated with the currency. The money puzzle box comprises a game board and a plurality of coin pieces. The plurality of coin pieces are pieces to a puzzle that are assembled upon the game board. The solution to the puzzle requires knowledge of a currency, which is being tested by the puzzle. The game board further folds into a box, which is used as a container within which the plurality of coin pieces are stored.

These together with additional objects, features and advantages of the money puzzle box will be readily apparent to those of ordinary skill in the art upon reading the following detailed description of the presently preferred, but nonetheless illustrative, embodiments when taken in conjunction with the accompanying drawings.

In this respect, before explaining the current embodiments of the money puzzle box in detail, it is to be understood that the money puzzle box is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the money puzzle box.

It is therefore important that the claims be regarded as including such equivalent construction insofar as they do not depart from the spirit and scope of the money puzzle box. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The money puzzle box 100 (hereinafter invention) comprises a game board 101 and a plurality of coin pieces 102. The invention 100 is adapted for use with a currency. The invention 100 is adapted for use with coins associated with the currency. The plurality of coin pieces 102 are pieces to a puzzle that are assembled upon the game board 101. The solution to the puzzle requires knowledge of a currency, which is being tested by the puzzle. The game board 101 further folds into a box 155, which is used as a container within which the plurality of coin pieces 102 are stored.

The game board 101 comprises a plurality of panels 130. The plurality of panels 130 further comprises a first panel 131, a second panel 132, a third panel 133, a fourth panel 134, a fifth panel 135, a sixth panel 136, a seventh panel 137, an eighth panel 138, and a ninth panel 139. Each of the plurality of panels 130 is further defined with a playing surface 153 and an exterior surface 154. The exterior surface 154 of each of the plurality of panels 130 is the surface distal from the playing surface 153. Each of the plurality of panels 130 are joined to each other such that a playing surface 153 is formed when the game board 101 is laid flat. Any initial panel selected from the plurality of panels 130 is joined to a subsequent panel selected from the plurality of panels 130 using a fold line selected from a plurality of fold lines 140.

Each of the plurality of fold lines 140 is an attachment that allows for the first selected panel to be rotated relative to the second selected panel to form a right angle. By properly folding each panel selected from the plurality of panels 130 relative to the panels remaining within the plurality of panels 130 a storage box 155 will be formed within which the plurality of coin pieces 102 can be stored. When the game board 101 is folded into a box 155, the exterior surfaces 154 of each of the plurality of panels 130 forms the visible exterior surface 154 of the box 155. When the game board 101 is folded into a box 155 format, the playing surfaces 153 of each of the plurality of panels 130 forms the interior surface 153 of the box 155. Once the game board 101 is folded into a box 155, the plurality of panels are held in position using the plurality of fasteners 160.

The plurality of fold lines 140 comprises a first fold line 141, a second fold line 142, a third fold line 143, a fourth fold line 144, a fifth fold line 145, a sixth fold line 146, a seventh fold line 147, and an eighth fold line 148. The first fold line 141 attaches the first panel 131 to the second panel 132. The second fold line 142 attaches the second panel 132 to the third panel 133. The third fold line 143 attaches the third panel 133 to the fourth panel 134. The fourth fold line 144 attaches the second panel 132 to the fifth panel 135. The fifth fold line 145 attaches the second panel 132 to the sixth panel 136. The sixth fold line 146 attaches the fourth panel 134 to the seventh panel 137. The seventh fold line 147 attaches the fourth panel 134 to the eighth panel 138. The eighth fold line 148 attaches the fourth panel 134 to the ninth panel 139.

The plurality of fasteners 160 comprises a first fastener 161, a second fastener 162, a third fastener 163, a fourth fastener 164, a fifth fastener 165, a sixth fastener 166, a seventh fastener 167, an eighth fastener 168, a ninth fastener 169, and a tenth fastener 170. The first fastener 161 attaches to the fifth panel 135. The second fastener 162 attaches to the fifth panel 135. The third fastener 163 attaches to the sixth panel 136. The fourth fastener 164 attaches to the sixth panel 136. The fifth fastener 165 attaches to the seventh panel 137. The sixth fastener 166 attaches to the seventh panel 137. The seventh fastener 167 attaches to the eighth panel 138. The eighth fastener 168 attaches to the eighth panel 138. The ninth fastener 169 attaches to the ninth panel 139. The tenth fastener 170 attaches to the first panel 131. When the game board 101 is folded into the box 155 format, the first fastener 161 fastens to the sixth fastener 166; the second fastener 162 fastens to the fifth fastener 165; the third fastener 163 fastens to the eighth fastener 168; the fourth fastener 164 fastens to the seventh fastener 167; the ninth fastener 169 fastens to the tenth fastener 170. In the first potential embodiment of the disclosure, each of the plurality of fasteners 160 is a magnet.

The playing surface 153 of the game board 101 is further defined with a playing area 156. The playing area 156 is a rectangular area demarcated on the playing surface 153 by a ridge 152. The depth of the ridge 152 is sized such that the ridge 152 forms a first cavity 151 within which the plurality of coin pieces 102 will be placed and contained.

The concept of the invention 100 is described in this paragraph. The surface area of the playing area 156 of the playing surface 153 represents the denomination of the banknote of a currency. It is generally preferred, but not necessary, that the lowest denomination of banknote used in the currency be used. Examples of such preferred banknotes would include, but are not limited to, the US one dollar banknote, the ECB five Euro banknote, or Japan's 1000 Yen banknote. Each of the plurality of coin pieces 102 is a token the represents a coin 157 within the currency. The surface area of a coin piece selected from the plurality of coin pieces 102 is sized such that when the selected coin piece is placed within the playing area 156 the proportion of the surface area of the playing area 156 covered by the selected coin piece is equivalent to the proportion of the value of the coin 157 represented by the selected coin piece to the value of the denomination of the currency represented by the playing area 156 of the playing surface 153. This makes it possible to use the invention 100 as a teaching tool wherein a player can use different combinations of coin pieces selected from the plurality of coin pieces 102 to cover the surface area of the playing area 156. When the playing area 156 is covered in such a manner, the sum of the value of the selected coin pieces covering the playing area 156 will equal the value of the denomination of the banknote represented by the playing area 156.

Each of the plurality of coin pieces 102 is a rectangular shaped card. As discussed elsewhere in this disclosure, the surface area of the card of each coin piece selected from the plurality of coin pieces 102 is proportional to the value of the coin 157 that the selected coin piece represents. Each of the plurality of coin pieces 102 are further organized into a sub-plurality of coin pieces. For the purposes of clarity within this disclosure, the plurality of coin pieces 102 will be assumed to further comprise a plurality of first coin pieces 111, a plurality of second coin pieces 112, a plurality of third coin pieces 113, a plurality of fourth coin pieces 114. Those skilled in the art will recognize that the invention 100 can be readily extended to accommodate additional coins in active circulation. This can be stated more specifically with an example: those skilled in the art will recognize that the invention 100 can be readily extended to accommodate the 6 coins currently available and in use within the US currency, the 7 coins currently available and in use within the Japanese currency or the 8 coins currently available and in use within the Eurozone currency.

The plurality of first coin pieces 111 comprises a collection of individual first coin mounts 121. Each individual first coin mount 121 comprises the rectangular shaped card described elsewhere within this disclosure. At the center of the individual first coin mount 121 is a first coin socket 125. The first coin socket 125 is a second cavity that is formed in a shape such that the physical coin 157 represented by the individual first coin mount 121 can be "snapped" into and securely stored within the first coin socket 125. The plurality of second coin pieces 112 comprises a collection of individual second coin mounts 122. Each individual second coin mount 122 comprises the rectangular shaped card described elsewhere within this disclosure. At the center of the individual second coin mount 122 is a second coin socket 126. The second coin socket 126 is a second cavity that is formed in a shape such that the physical coin 157 represented by the individual second coin mount 122 can be "snapped" into and securely stored within the second coin socket 126. The plurality of third coin pieces 113 comprises a collection of individual third coin mounts 123. Each individual third coin mount 123 comprises the rectangular shaped card described elsewhere within this disclosure. At the center of the individual third coin mount 123 is a third coin socket 127. The third coin socket 127 is a second cavity that is formed in a shape such that the physical coin 157 represented by the individual third coin mount 123 can be "snapped" into and securely stored within the third coin socket 127.

The plurality of fourth coin pieces 114 comprises a collection of individual fourth coin mounts 124. Each individual fourth coin mount 124 comprises the rectangular shaped card described elsewhere within this disclosure. At the center of the individual fourth coin mount 124 is a fourth coin socket 128. The fourth coin socket 128 is a second cavity that is formed in a shape such that the physical coin 157 represented by the individual fourth coin mount 124 can be "snapped" into and securely stored within the fourth coin socket 128.

Figure 1:
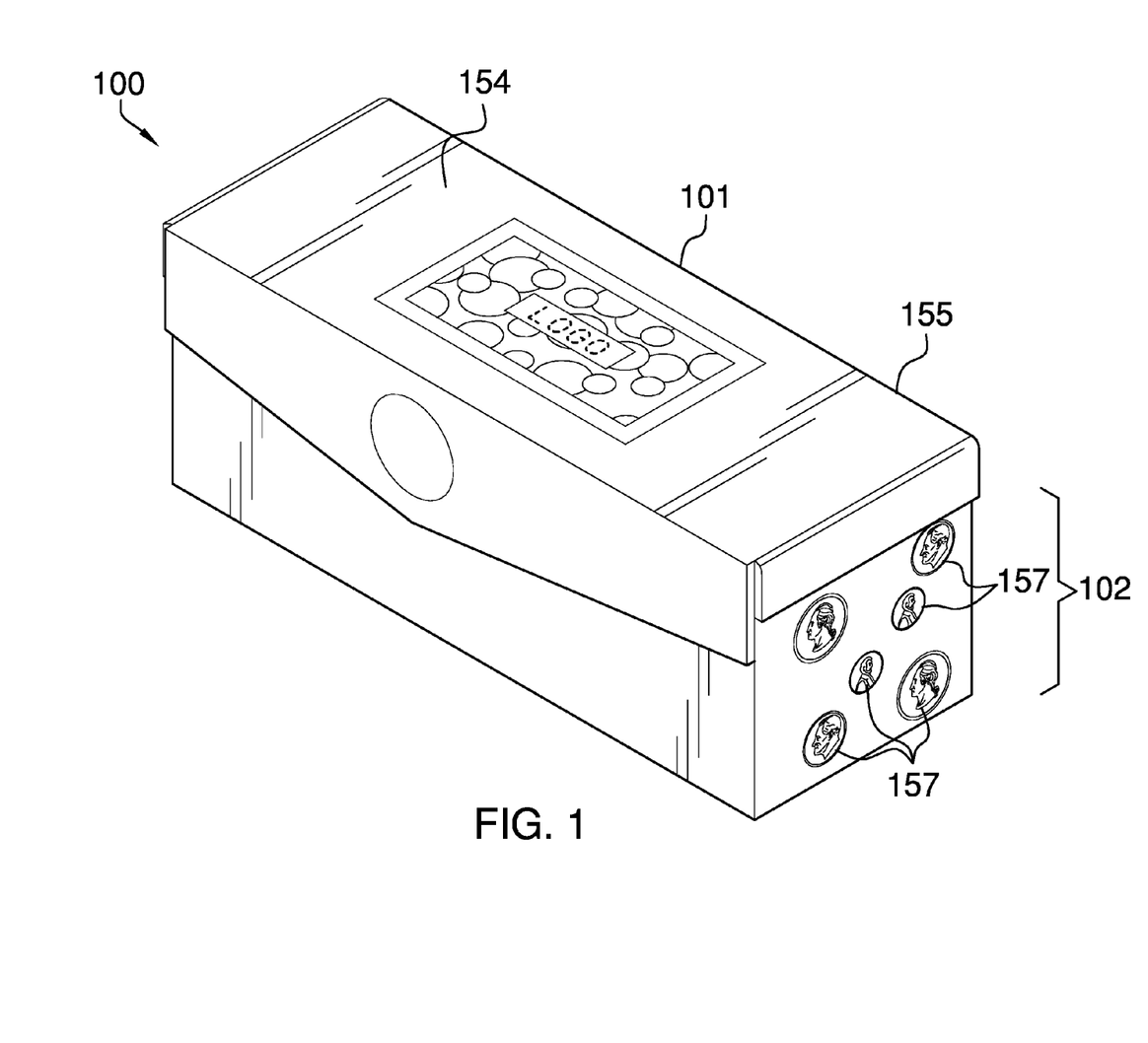
FIG. 1 is a closed perspective view of an embodiment of the disclosure.
Figure 2:
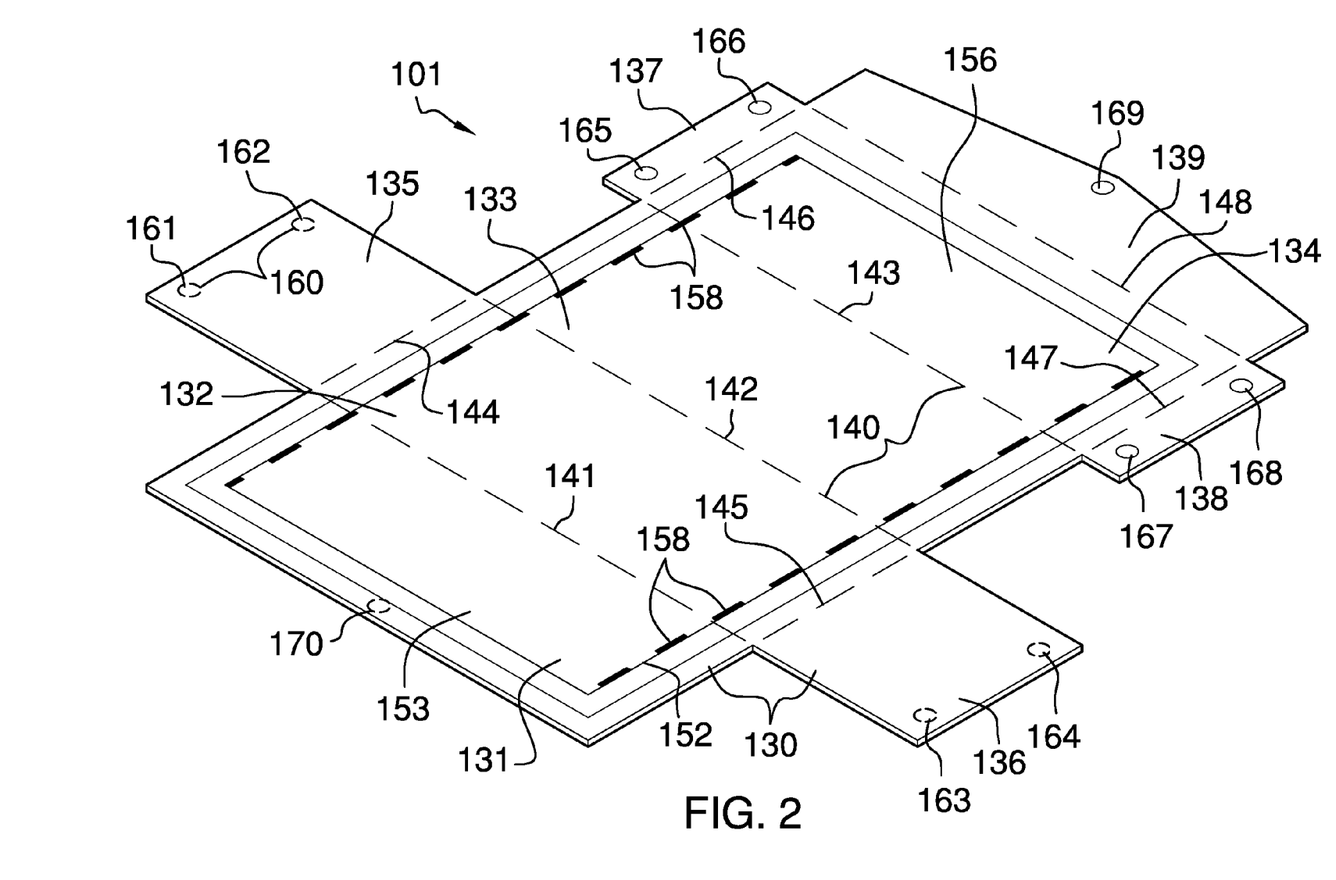
FIG. 2 is an open perspective view of an embodiment of the disclosure.
Figure 3:
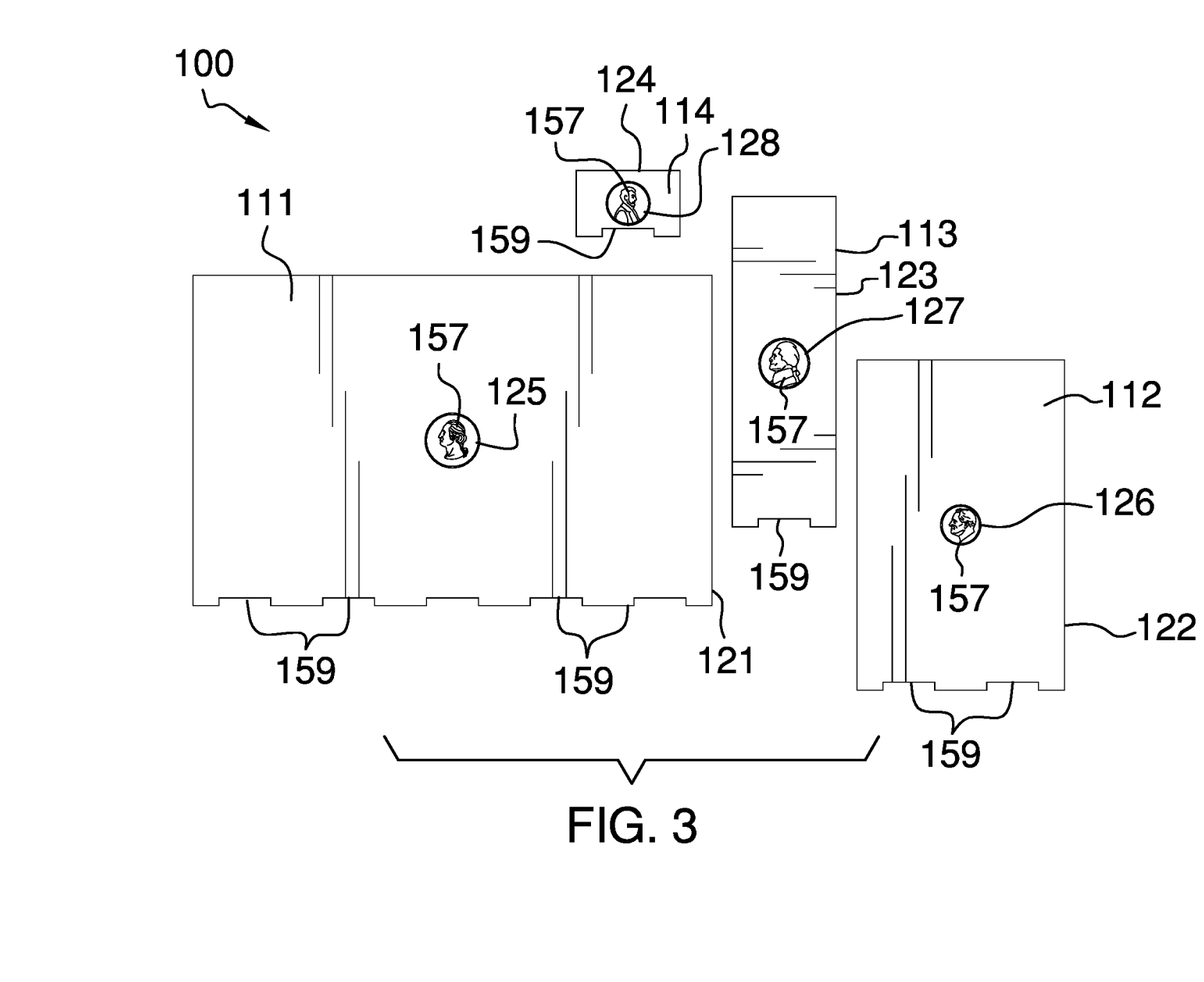
FIG. 3 is a detail view of an embodiment of the disclosure.
Figure 4:
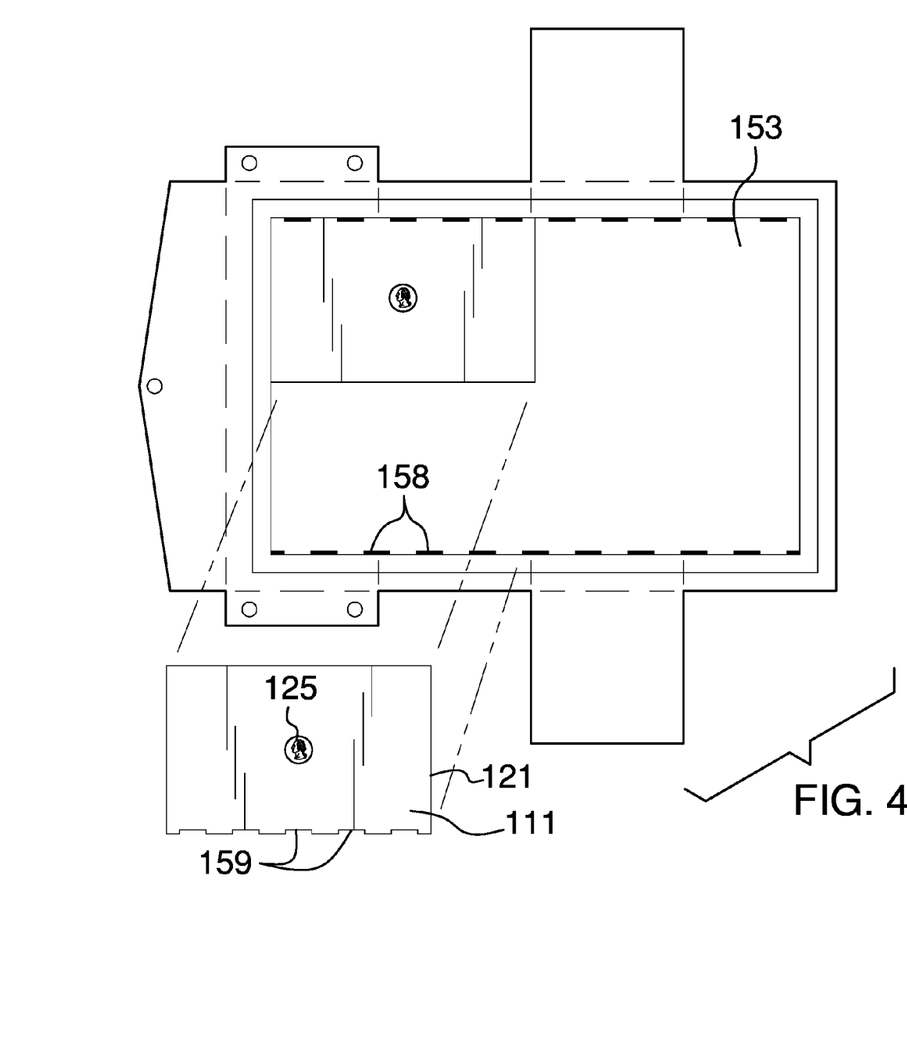
FIG. 4 is a top view of an embodiment of the disclosure.
Figure 5:
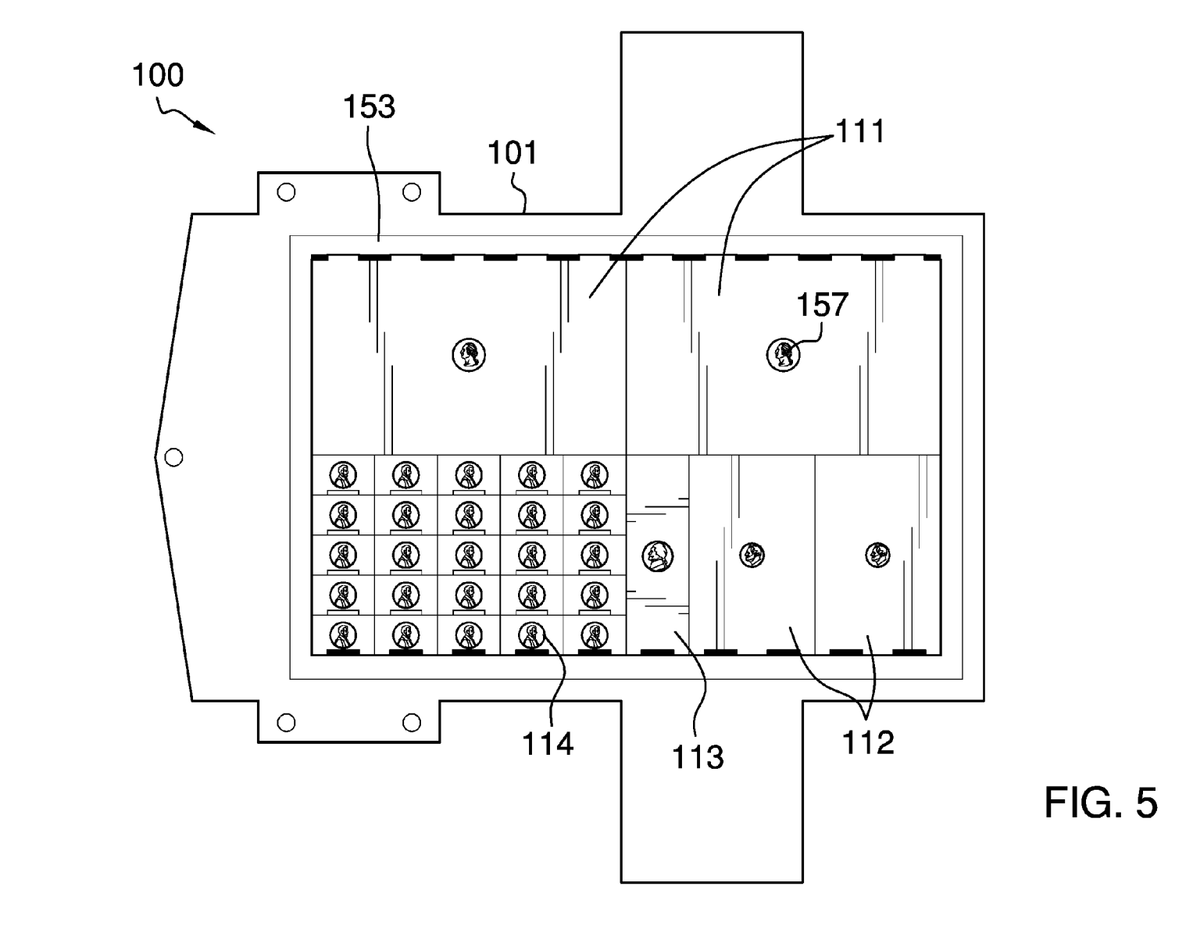
FIG. 5 is an in use view of an embodiment of the disclosure.

In the first potential embodiment of the disclosure, as shown most clearly in FIGS. 3 and 5, the ridge 152 and each of the plurality of coin pieces 102 are further formed with the interlocking tabs 158 and interlocking holes 159 that are characteristic of a jigsaw puzzle and are intended to be used in a similar manner.

It is envisioned that the invention 100 is a training puzzle that is used in teaching basic information regarding a currency system. For each individual first coin mount 121 selected from the plurality of first coin pieces 111, a coin that is represented by each individual first coin mount 121 is procured from the circulation of the currency and is inserted into the first coin socket 125 of each individual first coin mount 121. For each individual second coin mount 122 selected from the plurality of second coin pieces 112, a coin that is represented by each individual second coin mount 122 is procured from the circulation of the currency and is inserted into the second coin socket 126 of each individual second coin mount 122. For each individual third coin mount 123 selected from the plurality of third coin pieces 113, a coin that is represented by each individual third coin mount 123 is procured from the circulation of the currency and is inserted into the third coin socket 127 of each individual third coin mount 123. For each individual fourth coin mount 124 selected from the plurality of fourth coin pieces 114, a coin that is represented by each individual fourth coin mount 124 is procured from the circulation of the currency and is inserted into the fourth coin socket 128 of each individual fourth coin mount 124. Once the game is prepared as described above, the size and shape of each of the plurality of coin pieces 102 are such that any combination of coin pieces that are selected from the plurality of coin pieces 102 such that the selected combination of coin pieces cover the entire playing area 156 of the playing surface 153 will add up to equal the banknote that the playing area 156 represents. When training is completed, the game board 101 is folded into the box 155 as described elsewhere within this disclosure and the plurality of coin pieces 102 are stored within the box 155.

In the first potential embodiment of the disclosure, the coin 157 represented by the plurality of first coin pieces 111 is a US quarter. The coin 157 represented by the plurality of second coin pieces 112 is a US dime. The coin 157 represented by the plurality of third coin pieces 113 is a US nickel. The coin 157 represented by the plurality of fourth coin pieces 114 is a US penny.

In a second potential embodiment of the disclosure, a coin 157 represented by a fifth plurality of coin pieces is a US half dollar and a coin 157 represented by a fifth plurality of coin pieces is a US dollar coin.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Fastener: As used in this disclosure, a fastener device that is used to join or affix two objects. Fasteners generally comprise a first element, which is attached to the first object and a second element which is attached to the second object such that the first element and the second element join to affix the first object and the second object.

Puzzle: As used in this disclosure, a puzzle is a recreational or learning activity wherein the goal of the recreational or learning activity that involves mental activity in order to resolve problem.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A board game comprising:
a game board and a plurality of coin pieces;
wherein the board game is adapted for use with a currency;
wherein the board game is adapted for use with coins associated with the currency;
wherein the plurality of coin pieces are pieces to a puzzle that are assembled upon the game board;
wherein the wherein the game board further folds into a box;
wherein the box is used as a container within which the plurality of coin pieces are stored;
wherein the game board further comprises a plurality of panels and a plurality of folds;
wherein each of the plurality of panels is further defined with a playing surface and an exterior surface;
wherein the exterior surface of each of the plurality of panels is the surface distal from the playing surface;
wherein each of the plurality of panels are joined to each other such that a playing surface is formed when the game board is laid flat;
wherein any initial panel selected from the plurality of panels is joined to a subsequent panel selected from the plurality of panels using a fold line selected from a plurality of fold lines;
wherein each of the plurality of fold lines is an attachment that allows for the first selected panel to be rotated relative to the second selected panel to form a right angle;
wherein by folding each panel selected from the plurality of panels relative to the panels remaining within the plurality of panels the box is formed;
wherein when the game board is folded into a box format, the playing surfaces of each of the plurality of panels forms the interior surface of the box;
wherein when the game board is folded into a box format, the exterior surfaces of each of the plurality of panels forms the exterior surface of the box;
wherein the plurality of panels further comprises a first panel, a second panel, a third panel, a fourth panel, a fifth panel, a sixth panel, a seventh panel, an eighth panel, and a ninth panel;
wherein the plurality of fold lines comprises a first fold line, a second fold line, a third fold line, a fourth fold line, a fifth fold line, a sixth fold line, a seventh fold line, and an eighth fold line;
wherein the first fold line attaches the first panel to the second panel;
wherein the second fold line attaches the second panel to the third panel;

wherein the third fold line attaches the third panel to the fourth panel;
wherein the fourth fold line attaches the second panel to the fifth panel;
wherein the fifth fold line attaches the second panel to the sixth panel;
wherein the sixth fold line attaches the fourth panel to the seventh panel;
wherein the seventh fold line attaches the fourth panel to the eighth panel;
wherein the eighth fold line attaches the fourth panel to the ninth panel;
wherein the game board further comprises a plurality of fasteners;
wherein when the game board is folded into a box the plurality of panels are held in position using the plurality of fasteners;
wherein the plurality of fasteners comprises a first fastener, a second fastener, a third fastener, a fourth fastener, a fifth fastener, a sixth fastener, a seventh fastener, an eighth fastener, a ninth fastener, and a tenth fastener;
wherein the first fastener attaches to the fifth panel;
wherein the second fastener attaches to the fifth panel;
wherein the third fastener attaches to the sixth panel;
wherein the fourth fastener attaches to the sixth panel;
wherein the fifth fastener attaches to the seventh panel;
wherein the sixth fastener attaches to the seventh panel;
wherein the seventh fastener attaches to the eighth panel;
wherein the eighth fastener attaches to the eighth panel;
wherein the ninth fastener attaches to the ninth panel;
wherein the tenth fastener attaches to the first panel;
wherein when the game board is folded into the box the first fastener fastens to the sixth fastener;
wherein when the game board is folded into the box the second fastener fastens to the fifth fastener;
wherein when the game board is folded into the box the third fastener fastens to the eighth fastener;
wherein when the game board is folded into the box the fourth fastener fastens to the seventh fastener;
wherein when the game board is folded into the box the ninth fastener fastens to the tenth fastener;
wherein the playing surface of the game board is further defined with a playing area;
wherein the playing area is a rectangular area demarcated on the playing surface by a ridge;
wherein the depth of the ridge is sized such that the ridge forms a first cavity;
wherein each of the plurality of coin pieces is a card;
wherein the surface area of the card of each coin piece selected from the plurality of coin pieces is proportional to the value of the coin that is selected from a previously selected currency;
wherein each of the plurality of coin pieces are further organized into a sub-plurality of coin pieces that are organized by a plurality of coins selected from the previously selected currency;
wherein the plurality of coin pieces comprises a collection of individual coin mounts;
wherein each individual coin mount comprises the shaped card;
wherein at the center of the individual coin mount is a coin socket;
wherein the coin socket is a second cavity that is formed in a shape such that a physical coin selected from the previously selected currency fits into the coin socket;
wherein each of the plurality of fasteners is a magnet;
wherein the ridge is formed with a structure selected from the group consisting of interlocking holes and interlocking tabs;
wherein each of the plurality of coin pieces is formed with a structure selected from the group consisting of interlocking holes and interlocking tabs.

2. The board game according to claim 1
wherein the plurality of coin pieces comprises a plurality of first coin pieces, a plurality of second coin pieces, a plurality of third coin pieces, a plurality of fourth coin pieces;
wherein the plurality of first coin pieces comprises a collection of individual first coin mounts;
wherein at the center of the individual first coin mount is a first coin socket;
wherein the first coin socket is a second cavity that is formed in a shape of a first physical coin such that the first physical coin will fit into the first coin socket;
wherein the plurality of second coin pieces comprises a collection of individual second coin mounts;
wherein at the center of the individual second coin mount is a second coin socket;
wherein the second coin socket is a third cavity that is formed in a shape of a second physical coin such that the second physical coin will fit into the second coin socket;
wherein the plurality of third coin pieces comprises a collection of individual third coin mounts;
wherein at the center of the individual third coin mount is a third coin socket;
wherein the third coin socket is a fourth cavity that is formed in a shape of a third physical coin such that the third physical coin will fit into the third coin socket;
wherein the plurality of fourth coin pieces comprises a collection of individual fourth coin mounts;
wherein at the center of the individual fourth coin mount is a fourth coin socket;
wherein the fourth coin socket is a fifth cavity that is formed in a shape of a fourth physical coin such that the fourth physical coin will fit into the fourth coin socket.

3. The board game according to claim 2
wherein the first coin is a United States quarter;
wherein the second coin is a United States dime;
wherein the third coin is a United States nickel;
wherein the fourth coin is a United States penny.

4. The board game according to claim 3
wherein the plurality of coin pieces comprises a plurality of fifth coin pieces, a plurality of sixth coin pieces,
wherein the plurality of fifth coin pieces comprises a collection of individual fifth coin mounts;
wherein at the center of the individual fifth coin mount is a fifth coin socket;
wherein the fifth coin socket is a sixth cavity that is formed in a shape of a fifth physical coin such that the fifth physical coin will fit into the fifth coin socket;
wherein the plurality of sixth coin pieces comprises a collection of individual sixth coin mounts;
wherein at the center of the individual sixth coin mount is a sixth coin socket;
wherein the sixth coin socket is a seventh cavity that is formed in a shape of a sixth physical coin such that the sixth physical coin will fit into the sixth coin socket.

5. The board game according to claim 4
wherein the fifth coin is a United States dollar coin;
wherein the second coin is a United States half dollar coin.

6. The board game according to claim 5 wherein each of the plurality of fasteners is a magnet.

7. The board game according to claim 6
wherein the ridge is formed with a structure selected from the group consisting of interlocking holes and interlocking tabs;
wherein each of the plurality of coin pieces is formed with a structure selected from the group consisting of interlocking holes and interlocking tabs.

* * * * *